US009680737B2

(12) United States Patent
Bindrim et al.

(10) Patent No.: US 9,680,737 B2
(45) Date of Patent: Jun. 13, 2017

(54) TELECOMMUNICATIONS NETWORKS

(71) Applicants: Vodafone IP Licensing Limited, Newbury, Berkshire (GB); Cisco Technology, Inc., San Jose, CA (US)

(72) Inventors: Walter Bindrim, Newbury (GB); John Moughton, Newbury (GB); Martin Schubert, San Jose, CA (US); Margaret Kaczmarska, San Jose, CA (US); Varini Gupta, San Jose, CA (US)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 0 days.

(21) Appl. No.: 14/137,221

(22) Filed: Dec. 20, 2013

(65) Prior Publication Data

US 2015/0181467 A1 Jun. 25, 2015

(51) Int. Cl.
*H04W 28/08* (2009.01)
*H04L 12/725* (2013.01)
*H04W 88/16* (2009.01)
*H04W 40/02* (2009.01)

(52) U.S. Cl.
CPC .......... *H04L 45/308* (2013.01); *H04W 40/02* (2013.01); *H04W 88/16* (2013.01)

(58) Field of Classification Search
CPC ..... H04L 47/10; H04L 47/2441; H04L 47/30; H04L 47/32; H04L 12/5693
USPC ........................................................ 370/235
See application file for complete search history.

(56) References Cited

U.S. PATENT DOCUMENTS

| 8,626,115 | B2 * | 1/2014 | Raleigh | H04L 63/20 455/405 |
|---|---|---|---|---|
| 8,830,943 | B2 * | 9/2014 | Negus et al. | 370/329 |
| 2005/0041584 | A1 * | 2/2005 | Lau et al. | 370/235 |
| 2007/0129051 | A1 * | 6/2007 | Sung | H04W 76/005 455/403 |
| 2008/0159125 | A1 * | 7/2008 | Ando | H04L 63/0892 370/221 |
| 2008/0225721 | A1 * | 9/2008 | Plamondon | H04L 47/10 370/235 |
| 2008/0254833 | A1 * | 10/2008 | Keevill | H04L 12/5692 455/558 |
| 2011/0070906 | A1 * | 3/2011 | Chami | H04L 45/22 455/507 |
| 2012/0129517 | A1 * | 5/2012 | Fox | H04L 41/5025 455/425 |

(Continued)

FOREIGN PATENT DOCUMENTS

WO  0119116 A1  3/2001
WO  2013164474 A2  11/2013

OTHER PUBLICATIONS

European Search Report issued in EP Application No. 14199303, dated Apr. 15, 2015.

*Primary Examiner* — Mark Rinehart
*Assistant Examiner* — Sanjay K Dewan
(74) *Attorney, Agent, or Firm* — Workman Nydegger

(57) ABSTRACT

A mobile telecommunications network includes a core network operable to provide core network functions; and a radio access network having control means, and radio means for wireless communication with terminals registered with the telecommunications network. In some embodiments the control means includes a client function operable to cause routing of traffic within the control means.

17 Claims, 10 Drawing Sheets

(56) References Cited

U.S. PATENT DOCUMENTS

| | | | |
|---|---|---|---|
| 2014/0226485 A1* | 8/2014 | Heinz et al. ................. | 370/235 |
| 2015/0085650 A1* | 3/2015 | Cui ....................... | H04W 92/02 |
| | | | 370/230 |
| 2015/0140983 A1* | 5/2015 | Cosimini ............ | H04W 76/022 |
| | | | 455/418 |
| 2015/0181467 A1* | 6/2015 | Bindrim ................ | H04W 40/00 |
| | | | 370/235 |
| 2015/0245241 A1* | 8/2015 | Posz ................ | H04W 28/0268 |
| | | | 370/235 |

* cited by examiner

| IP | UDP | GTP HDR (message-type = ECHO Req) | Private Extn (Length, Extension Identifier, Downlink TEID, SAVI-HDR=Discovery-Req, Bearer _ID , Data {}) |

| IP | UDP | GTP HDR (message-type = ECHO RSP) | Private Extn (Length, Extension Identifier, Uplink TEID, SAVI-HDR=Discovery-Rsp, Bearer _ID,Data {}) |

| IP | UDP | GTP HDR | T_PDU (SAVI-HDR=Discovery Request}, Data {}) |

| IP | UDP | GTP HDR | T_PDU (SAVI-HDR = Discovery Response, Data {Policy Info}) |

Figure 11

| IP | UDP | GTP HDR | T_PDU (SAVI-HDR=Open Request}, Data {}) |

Figure 12

| IP | UDP | GTP HDR | T_PDU (SAVI-HDR = Open Response, Data) |

Figure 13

| IP | UDP | GTP HDR | T_PDU (SAVI-HDR = Open Confirm, Data) |

Figure 14

| IP | UDP | GTP HDR (message-type = ECHO Req) | Private Extn (Length, Extension Identifier, Uplink TEID, SAVI-HDR=Update-Req, Bearer _ID, Services Data {}) |

Figure 15

| IP | UDP | GTP HDR (message-type = ECHO RSP) | Private Extn (Length, Extension Identifier, Downlink TEID, SAVI-HDR=Update-Rsp, Bearer _ID, Data {Policy Data}) |

Figure 16

| IP | UDP | GTP HDR (message-type = ECHO REQ) | Private Extn (Length, Extension Identifier, Uplink TEID, SAVI-HDR=Copy_Data, Bearer _ID, U/D/V flag, Data {Copy Data}) |

Figure 17

| IP | UDP | GTP HDR | T_PDU (SAVI-HDR = Update-Req, Data { }) |

Figure 18

| IP | UDP | GTP HDR | T_PDU (SAVI-HDR = Update Rsp, Data {Policy Info}) |

Figure 19

| IP | UDP | GTP HDR | T_PDU (SAVI-HDR = Copy_Data, U/D/V flag, Data {Copy Data}) |

Figure 20

TELECOMMUNICATIONS NETWORKS

TECHNICAL FIELD

The present invention relates to a mobile telecommunications network including a core and a radio access network having radio means for wireless communication with mobile terminals registered with the network, and to a corresponding method.

BACKGROUND TO THE INVENTION

Conventional mobile telephone communications networks have architectures that are hierarchical and traditionally expensive to scale. Many of the network elements, such as the BTS, routers, BSC/RNC etc. are partly proprietary: devices of one manufacturer often do not interface with devices from another manufacturer. This makes it difficult to introduce new capabilities into the network as a fully standardised interface will be required for devices from each manufacturer. Further, conventional base stations are not capable of intelligent local routing or processing. Furthermore, the capacity of existing networks is not always used effectively. For example, many cell sites are under used, whilst others are heavily used.

The current cellular network architecture has the following disadvantages:—
- Hierarchical and expensive to scale
- Backhaul is a major problem
- Proprietary platforms: BTS, BSC/RNC, SGSN etc
- Closed nodes and interfaces
- Very limited application or customer awareness (except for QoS priority)
- No intelligent local routing or processing
- Inefficient use of installed capacity There is therefore a need to overcome or ameliorate at least one of the problems of the prior art. In particular there is a need to address the needs of both the network operators and the users in improving the provision of mobile broadband data services.

Today mobile service delivery is provided through the mobile operator's packet core. Such a packet core may host a series of applications for enhancing the mobile service. To offer some of the applications, e.g. caching, closer to the user, the Applicant proposed to move potential applications on to "General Purpose Hardware Platform" hardware located at the edge of the radio access network.

EP2315412 describes the introduction of a novel control means or Platform (known as a Smart Access Vision (SAVi) platform) at the network edge. To open the radio access part a "General Purpose Hardware Platform" may be implemented at the network edge. This may allow operators to split the functions of an Radio Network Controller (RNC) and/or a (e)NodeB between hardware and software. As a consequence operators have the capability to place applications and content directly at the edge of the network. The SAVi concept also introduces new functions in the network core.

SAVi may enable a mobile operator to deploy (in-line) services in radio access networks nodes such as base stations (e.g. eNodeB) and radio network controllers. Deploying such services in the radio access network can enhance the subscriber's mobile experience since service delivery avoids the link between the radio access network and the rest of the core network. Especially when services are deployed in base stations, transmitting volumes of data over a potentially narrow-band backhaul link can be reduced. Reducing these transmissions improve the round-trip delay for packet interactions and may increase the amount of bandwidth available for the mobile subscriber.

By avoiding backhaul communication for voluminous traffic, a mobile operator may be able to avoid expensive backhaul upgrades to keep pace with the capabilities of communication over the wireless channel. Examples of base station hosted services that reduce backhaul traffic are: locally hosted gaming applications with reduced latency and significantly improved response times or caching/CDN which reduce backhaul loading.

There are requirements that make service delivery through radio access network resources a challenge e.g. Lawful Intercept (LI), or charging. A Law Enforcement Agency (LEA) may demand a copy of all data transmitted to and received from a mobile subscriber for subscribers of interest. Only core network elements are deemed secure and which implies that no radio access network equipment can be used to provide the packets flows to the LEA. The implication for radio access network based services is that mechanisms need to be put in place to "copy" all data altered by services executing in the radio access network to the mobile packet core to enable the lawful intercept function.

Charging is a function that operates in the mobile packet core and counts the amount of data, time of day and use of additional services. This charging function enables the mobile operator to send a bill to the mobile operator's customer for services rendered. If services operate in the radio access network, the operator may not be able to provide accurate bills. Again, by copy of data from the radio access network to the mobile packet core as is done for the lawful intercept function existing charging infrastructures may operate without modification.

It is an object of embodiments of the present invention to provide message flows to operate SAVi or similar control means in the radio access network.

While the embodiments are generally applicable in a Radio Access Network (RAN), the key target deployments include LTE and iHSPA base stations. The embodiments may also operate through UMTS radio network controllers (RNCs), GSM/GPRS base station controllers (BSCs) and other RAN functions.

SUMMARY OF THE INVENTION

According to a first embodiment of the present invention, there is provided a mobile telecommunications network including:
- a network core operable to provide core network functions; and
- a radio access network having control means, and radio means for wireless communication with terminals registered with the telecommunications network;
- wherein the control means includes a client function operable to control routing of traffic within the control means.

The client function may be operable to control routing of traffic within the control means according to policy information provided by a director function of the network core.

The policy information may be specific to a terminal, a user or to a particular bearer.

The director function, in response to a change in the policy information, may be operable to provide the client function with the an indication of the change in the policy information, the client function being operable to control routing of traffic within the control means according to the change in the policy information.

The client function may be operable to send a message to the director function to indicate a change in the services available on the control means, the director function updating the policy information in response thereto.

The client function may be operable to control routing of traffic within the control means to one or more applications hosted by the control means.

The client function may be operable to verify the functioning of an application hosted by the control means.

The control means may be operable to receive a request for service from one of the terminals for the application, to send the request to the application and to send a response from the application to the terminal, wherein the control means is further operable to send a copy of the request for service and a copy of the response to the core network to enable the core network to verify the operation of the application.

The client function may be operable to copy data from one of the applications hosted by the control means to the network core, based on the policy information.

Uplink and downlink user traffic for the terminals may be routed through the client function such that the user traffic can be processed in accordance with the policy information.

The client function may be operable to distinguish between the uplink and downlink user traffic.

The present invention also provides a corresponding method of operating a mobile telecommunications network.

BRIEF DESCRIPTION OF THE DRAWINGS

For a better understanding of the present invention embodiments will now be described by way of example, with reference to the accompanying drawings, in which:

FIG. 11 shows SCNC (client) SAVi Discovery Response;

FIG. 12 shows SCND (director) SAVi Open Request message in the relationship establishment procedure of FIG. 21;

FIG. 13 shows SCNC (client) Open Response message in the relationship establishment procedure of FIG. 21;

FIG. 14 shows SCNC (client) Open Confirm message in the relationship establishment procedure of FIG. 21;

FIG. 15 shows SCNC (client) SAVi Update Request packet;

FIG. 16 shows SCND (director) SAVi Update Response packet;

FIG. 17 shows SCND (director) SAVi Copy Data;

FIG. 18 shows SCNC Update Request packet (Services Data);

FIG. 19 shows SCND (director) Update Response packet;

FIG. 20 shows SCNC (client) Copy Data Packet;

DETAILED DESCRIPTION OF EMBODIMENTS OF THE INVENTION

1. Introduction

Figure 1:
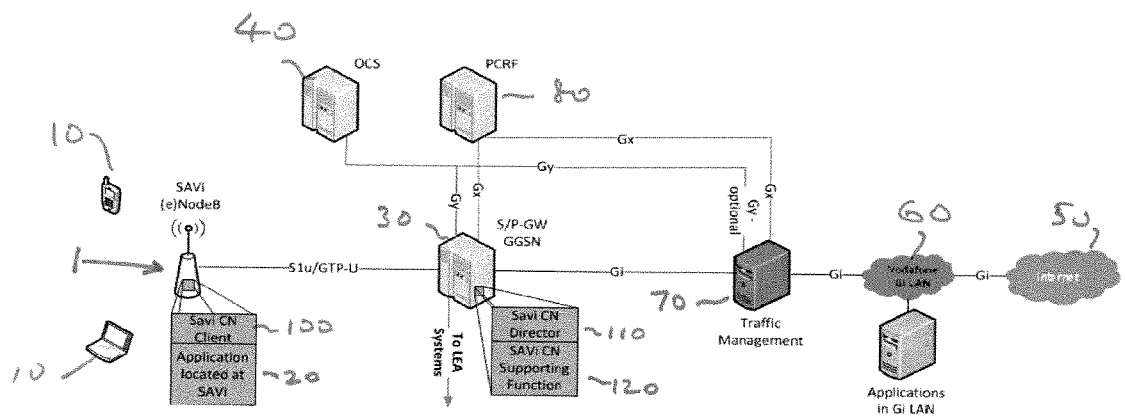
FIG. 1 shows SAVi Core Network Integration Architecture.

In an embodiment a control means is on Platform 1 (sometimes referred to as a SAVi platform) that provides services in a hosted SAVi processing environment. To offer core network support to a user/subscriber device 10 a SAVi Core Network integration architecture has been defined and is shown in FIG. 1. Further a solution is proposed to exchange user traffic related signalling as part of the GPT-U (GPRS Tunnelling Protocol User plane) traffic.

This embodiment provides message flows and methods to establish a communication and exchange signalling messages between SAVi functions located in the network core and SAVi functions located on the SAVi Platform in the RAN (Radio Access Network).

FIG. 1 shows the system architecture of certain elements of the network. The Platform 1 is provided at the network edge and provides (e)NodeB/base station functions to the mobile terminal (user entity, UE) 10 by wireless communication.

The Platform 1 further includes an application (or service or function) 20 which may generate content for supply to the UE 10. In practice, a plurality of applications are likely to be hosted on the Platform 1.

The Platform 1 is connected via an S1 interface to the core network, which comprises a gateway 30 (e.g. GGSN/P-GW/SAE-GW). The gateway 30 facilitates the provision of core network functions, such as LI by an LEA, and charging, by online charging system 40.

The gateway 30 receives content from a primary content source via the Internet 50. The primary content is delivered from the primary content source via Gi LAN 60. This content is received by traffic management function 70 before delivery to the gateway 30.

A PCRF (Policy and Charging Rules Function) apparatus 80 is also provided, in communication with the gateway 30.

The arrangement uses two special functions where one function is located in the SAVi Platform 1 a so-called SAVi CN Client 100 (SCNC 100)—and the second function—a SAVi CN Director 110 (SCND 110)—is part of the GGSN/P-GW/SAE-GW 30 or close by the GGSN/P-GW/SAE-GW 30.

The SAVi director 110 communicates with SAVi CN Client 100 (located on the SAVi Platform 1) via a communication API to, e.g., send polices or collect data. As mentioned above the SAVi Director 110 is preferably located on the GGSN/PGW/SAE-GW 30 or close by to get user information/triggers in real time.

To support a secure and trusted communication between the SAVi CN Client 100 and the SAVi Director 110 the following functions are preferably supported by the SAVi Director 110:

Securely authenticate with SAVi CN Client 100.

Establishment of a secure communication between SAVi CN Client 100 and SAVi Director 110.

SAVi Director 110 also is able to exchange information with the SAVi CN Client 100

This "director" module 110 is hosted in the mobile packet core (CN) and retrieves user identities and communicates those to the SCNC 100. The SCND 110 is responsible for managing functions and services in the SCNC 100. Thus, the SCND 110 is responsible for selecting subscribers that need to be subjected to SAVi local services, the SCND 110 manages user access services and user capabilities through SCNC 100, and SCND 110 informs the appropriate SCNCs 100 how to route traffic in the SAVi RAN environment.

The SAVi CN Client 100 is located on the SAVi server Platform 1 and may support the following functions:

Authenticate with the SAVi Director 110.

Inform the SAVi Director 110 about new user sessions.

Informs the SAVi Director 110 about content and application used by a specific user.

Steers the content flow based on the SAVi Director 110 settings pushed to the SAVi CN client 100 per user and per application.

This "client" 100 in the SAVi Platform 1 (located in the radio access network) communicates with the core network (CN) and manages subscriber identities, policies and services to be applied on selected subscribers.

The gateway 30 further includes a SAVi core network supporting function (SCNSF) 120. The SCNSF 120 is a function located in the mobile packet core (CN) providing additional support to operate SAVi. For example, when content is modified by the SCNC 100, the SCNSF 120 function may provide supporting functionality for charging, lawful intercept and other mandatory core functions, and/or SCNSF 120 may support functionality to aid in mobility management.

The SAVi core integration architecture described above functions correctly in the environment where not all gateways are SAVi capable and not all base stations have SAVi capabilities. Further it must be considered that the S-GW and P-GW are not necessarily collocated as is shown (at gateway 30) for simplicity reasons in FIG. 1.

In the embodiment all uplink and downlink user related packets are routed through SCNC 100 on the SAVi Platform 1 and through SCND 110 in the core (although this is not essential).

The proposed integration for user specific traffic and signalling provides basic core functions to SAVi Platform 1 for the user, e.g.:

Lawful Interception

Charging

Policy functions

2. General Core Network Requirements

The following is a basic list of preferred requirements from the core network point of view. This embodiment meets these requirements so that service parity is delivered with and without SAVi and that there is no impact on available Gi and core services and a limited impact on the core nodes in case of introduction of SAVi.

General core network related functions, service are not affected, such as IP Address allocation, GTP (GPRS Tunnelling Protocol)/PDP handling, Core pooling, Charging, Policy enforcement, HTTP header enrichment, or Traffic Management.

Differentiated Services: MPC (Mobile Packet Core) remains the place that manages subscriber policies and services.

Transparent User Behaviour: The user behaviour is consistent whether the user is connected to a base station with or without SAVi, for those services that remain available from the core network outside of SAVi-enabled base-stations.

Security: Mutual authentication of new network elements. Content stored on a SAVi base station is safe and privacy guaranteed.

Lawful Interception (LI) works without any modification at the LI systems and SAVi locally generated content is captured by LI systems as if content originates from the core network.

3. Traffic Flows Through SAVi

SAVi manages GTP-based traffic originating or terminating in the RAN, and terminating or originating in the mobile packet core. Examples of mobile packet core nodes are a GPRS gateway support node (GGSN) or PDN gateway (P-GW), designated 30 in FIG. 1. An example of a RAN node is a LTE or iHSPA base station, designated 1 in FIG. 1. SAVi (here SCNC 100 100) can also be applied in other RAN nodes such as RNCs.

Note that a combined S/P-GW node must not be assumed. The S-GW and P-GW could be also separated. The solution is applicable to both ways of deploying SAE-GW's.

SCNC 100 is a user-plane function that operates in the RAN and manages core related functions for the user traffic only. In the embodiment all user traffic between mobile node 1 and mobile packet core is routed via the SCNC 100. This is because the RAN nodes themselves do not have sufficient knowledge to identify users.

The SAVi Platform 1 is shown in more detail in FIGS. 1-7. The Platform 1 includes (e)NodeB module 200 operable to perform radio functions corresponding to those of a conventional (e)NodeB, (LTE or 3G base station) a SAVi functions module 210 operable to route packets within the Platform 1, the SCNC 100 and a plurality of applications (or services or functions) 20A, 20B. The applications 20A, 20B (and 20) are typically user applications that provide services to a user of a mobile device 10.

3.1 Uplink Traffic

The decision if packets will get routed to specific application depends on, for example, the user profile, the service capabilities, or the user status.

The SCNC 100 is the interface to all applications 20A, 20B hosted on the Platform 1, as any error introduced by an application in constructing the GTP header could cause serious problems, e.g. if the Tunnel End point ID (TEID) gets changed. Therefore the applications use a Transport-Protocol Data Unit T-PDU (user packet) tagged with a bearer ID, e.g. the 4-tuple+U/D (uplink/downlink) flag. The SCNC 100 constructs the GTP-U header in this case.

The SCNC 100 relies on the SAVi Platform 1 environment routing capabilities to route packets between applications 20A/20B and the SCNC 100.

Figure 22:
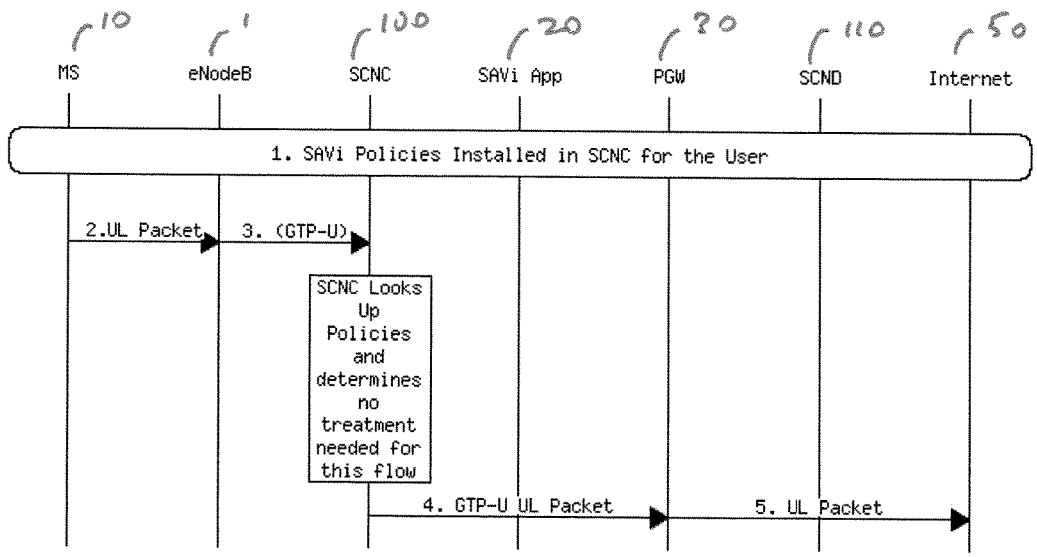
FIG. 22 shows Uplink Packet—No Rule for this Flow.

FIG. 22 shows the flow of messages when no processing by an application 20, 20A, 20B is required. The following steps are shown in FIG. 22.

(1) The SAVi Relationship has been established and therefore the SCNC 100 knows about the policies to be associated with this bearer. Any subsequent traffic arriving at SCNC 100 on this bearer will be subjected to these policies.

(2), (3) User sends a packet in uplink direction. This message is encapsulated inside GTP-U by eNodeB and routed into SCNC 100.

(4) SCNC 100 looks up policies and determines no treatment needed for this traffic (identified by 5-tuple) and hence releases the packet in uplink direction to P-GW.
(5) P-GW releases the packet into external PDN after performing LI/Billing functions as needed.

Figure 24:
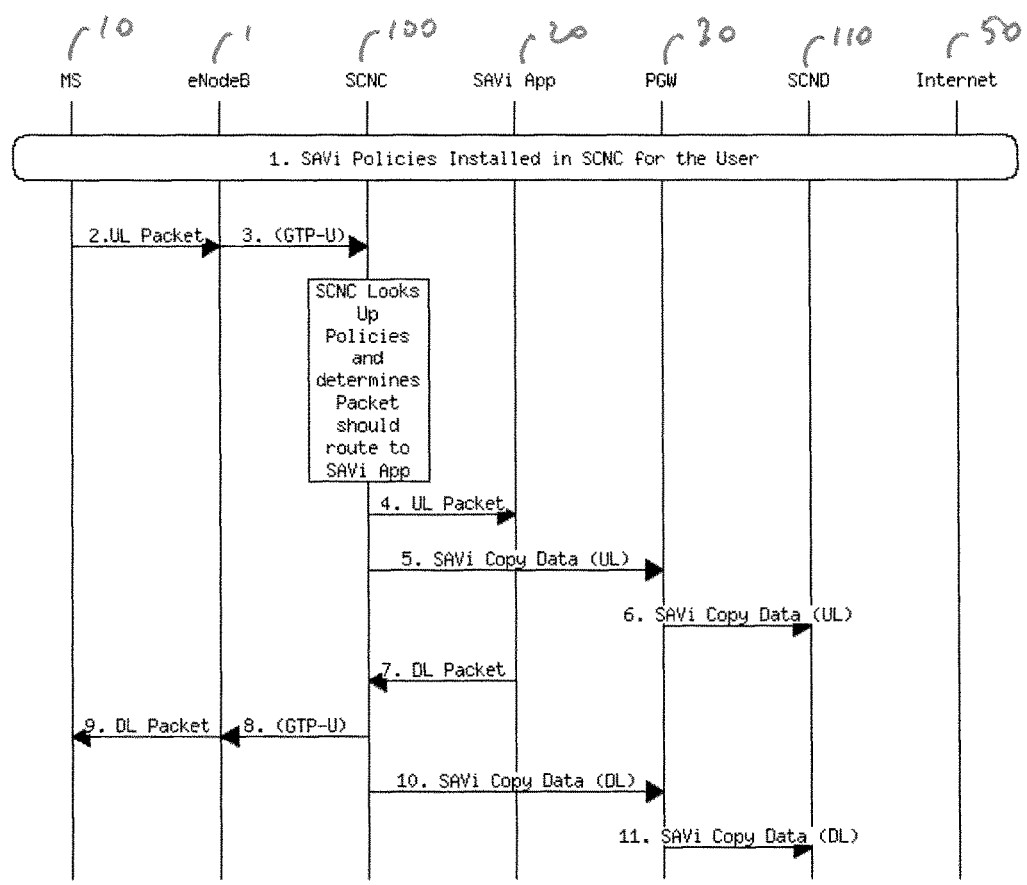
FIG. 24 shows Uplink Packet—SAVi Delivered Services.

FIG. 24 shows the flow of messages when processing by an application 20, 20A, 20B is required. The following steps are shown in FIG. 24.
(1) The SAVi Relationship has been established and therefore the SCNC 100 knows about the policies to be associated with this bearer. Any subsequent traffic arriving at SCNC 100 on this bearer will be subjected to these policies.
(2), (3) User sends a packet in uplink direction. This message is encapsulated inside GTP-U by eNodeB and routed into SCNC 100.
(4) SCNC 100 looks up policies and determines that this packet needs to be processed by SAVi services hosted at the eNodeB (identified by 5-tuple). The packet is hence routed into the SAVi application (SCNC 100 may strip off GTP-U header before routing the traffic into SAVi App).
(5) At this point SCNC 100 needs to send a copy of uplink user request packets to P-GW for Lawful Intercept and Charging purpose. It encapsulates this packet into SAVi a Copy Packet format and sends the packet in the uplink direction.
(6) P-GW routes these packets into SCND 110 so that these packets can be decapsulated for use in LI and charging functions.
(7), (8), (9) If SAVi App can service the request locally (e.g. caching application), it sends a downlink packet. The packet is sent in the downlink direction to the UE (eNodeB may need to encapsulate the packet into GTP-U if application itself does not do so).
(10) At this point SCNC 100 may need to send a copy of downlink packets send to the user to P-GW for Lawful Intercept and Charging purpose (see section 3.5). It encapsulates this packet into SAVi Copy Packet format and sent the packet in the uplink direction.
(11) P-GW routes these packets into SCND 110 so that these packets can be decapsulated for use in LI and charging functions.

Figure 2:
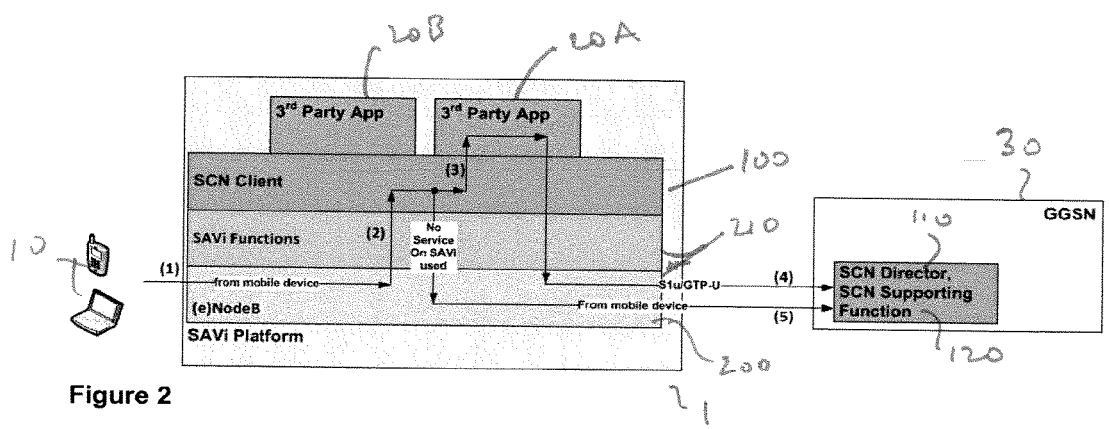
FIG. 2 shows Uplink traffic on SAVi Platform.

FIG. 2 shows uplink traffic on SAVi Platform 1. In the Uplink direction, the flow of user traffic is as follows:
(1) the packet transmitted by UE 10 is encapsulated into GTP-U by the eNodeB 200,
(2) eNodeB 200 routes the packet into SCNC 100,
(3) If SCNC 100 determines that the packet needs further processing by, e.g., network or third Party Apps 20A/20B, it is rerouted via the SAVi Platform 1 into those Apps and
(4) After processing, the Apps 20A/20B (in this example) then forward the traffic back, via the SCNC 100, to encapsulate in GTP-U in the eNodeB function 200, which then forwards it towards the core (gateway 30). Other traffic routings are possible.

3.2 Downlink Traffic

Figure 23:
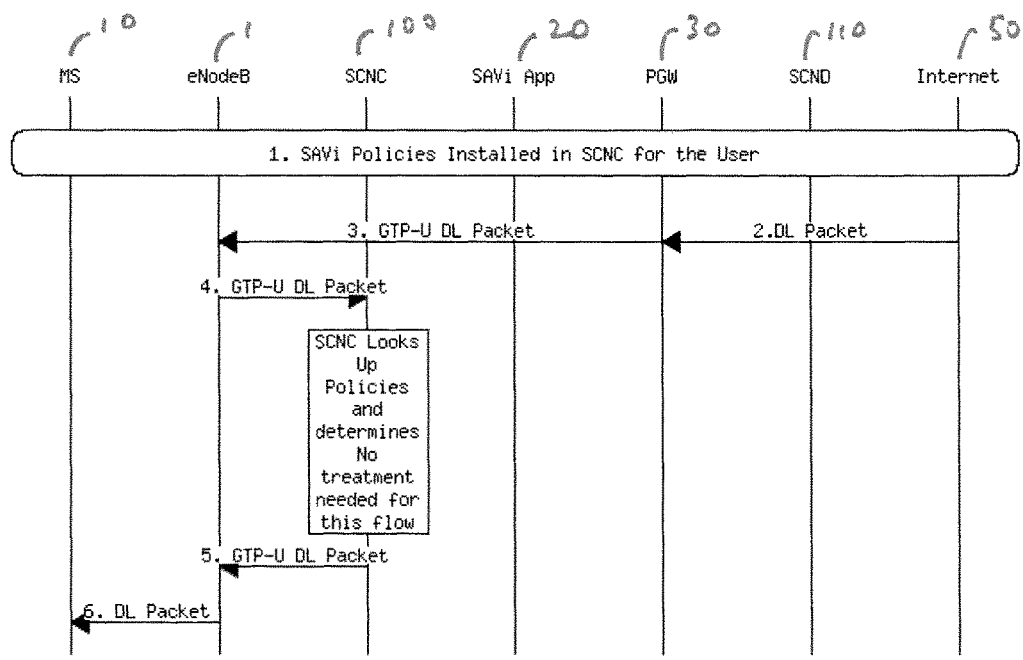
FIG. 23 shows Downlink Packet—No Rule for this Flow.

FIG. 23 shows the flow of messages when no processing by an application 20, 20A, 20B is required. The following steps are shown in FIG. 23.
(1) The SAVi Relationship has been established and therefore the SCNC 100 knows about the policies to be associated with this bearer. Any subsequent traffic arriving at SCNC 100 on this bearer will be subjected to these policies.
(2), (3) P-GW receives downlink packet to be delivered to the user. It encapsulates the packet into GTP-U and sends it in the downlink direction.
(4) The packet arrives at eNodeB. The eNodeB routes the packet into SCNC 100.
(5) SCNC 100 Looks up into the policies installed for the user (bearer) and determines that no treatment is needed for this flow (identified by 5-tuple), and hence sends the packet in the downlink direction.
(6) eNodeB sends the packet to the user.

Figure 3:
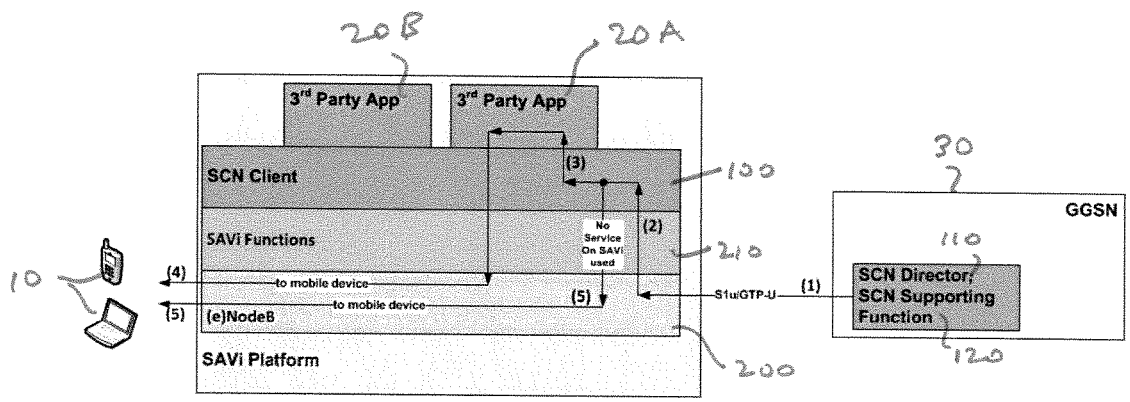
FIG. 3 shows Downlink traffic on SAVi Platform.

FIG. 3 shows downlink traffic on SAVi Platform 1. In the downlink direction, the flow of user traffic is:
(1) the GTP-U packet is transmitted from the core (gateway 30) to eNodeB 200,
(2) eNodeB 200 routes the packet into SCNC 100,
(3) If SCNC 100 determines that the packet needs further processing by, for example, network or third party Apps 20A/20B, it is rerouted into those Apps and
(4) after processing, the Apps forward the traffic via the SCNC 100 to encapsulate in GTP-U in eNodeB 200, which then transmits it towards the UE 10.
(5) In case no Apps are used (or required to process the data packets), the SCNC 100 forwards the traffic back to eNodeB 200 which then forwards it to the UE 10.

The SCNC 100 maintains a service table comprising a list of subscribers by way of their uplink and downlink GTP tunnel identities (e.g. TEIDs+TLAs, Transport Layer Addresses) and the appropriate actions (policies) that are to be taken on those packets. This table is managed by the mobile packet core's SCND 110 pushing policies to the SCNC 100 and an open interface exists in the SCND 110 to populate this table with session routing information.

3.3 Service Chaining

Figure 4:
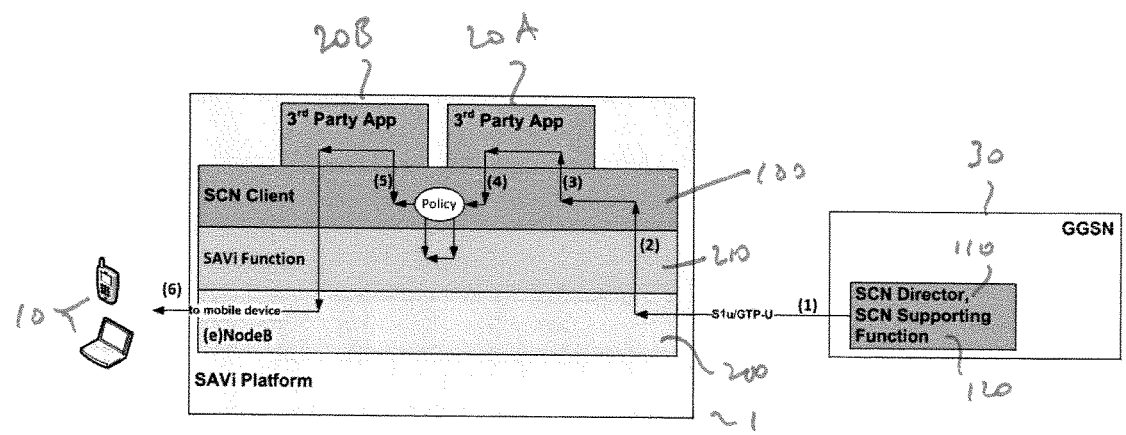
FIG. 4 shows Downlink service chaining based on policies.

FIG. 4 shows downlink service chaining based on policies, which is supported by the SCNC 100.

In general the SCNC 100 is capable of applying more than a single application 20A/20B to a given user flow passed on policies as shown in FIG. 4. However it is not expected usually to have many applications applied to a given user flow. Even so a user may have in total several active flows, each through one or more applications.

In the case of Policy based chaining the SCNC 100 has to get back the data flow from one application 20A and routes it to the next application 20B based on the policies for that GTP-U.

In Downlink direction, the flow of user traffic is:
(1) the GTP-U packet is transmitted from the core (gateway 30) to eNodeB 200,
(2) eNodeB 200 routes the packet into SCNC 100,
(3) if SCNC 100 determines that packet needs further processing by, for example, network or third party App 20A, it is rerouted into the App 20A,
(4) after processing, the App 20A forwards the traffic back to the SCNC 100 where the policy for the packet is consulted. SCNC 100, based on the policy, sends the packet to the SAVi Function 210 which is responsible for the internal routing between different applications.
(5) in this example, as the policy specifies that the packet should then be processed by App 20B, the SCNC 100 routes the packet to App 20B, and
(6) after processing, the App 20B forwards the traffic via the back to the SCNC 100 to encapsulate in GTP-U back to eNodeB 200, which then transmits it towards the UE 10.

Figure 5:
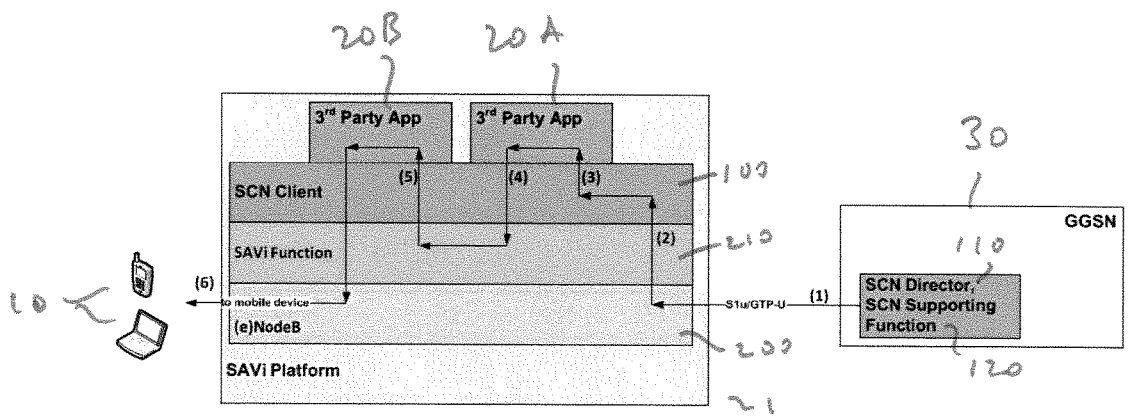
FIG. 5 shows Downlink service chaining based on predefined service chain.

FIG. 5 shows a downlink service chaining based on a predefined service chain. In this case the application and the SAVi Platform 1 need to be capable of handling the service chain in a predetermined way (e.g. not according to a changeable policy).

In Downlink direction, the flow of user traffic is:
(1) the GTP-U packet is transmitted from the core (gateway 30) to eNodeB 200,
(2) eNodeB 200 routes the packet into SCNC 100,
(3) if SCNC 100 determines that packet needs further processing by, for example, network or third party App 20A, it is rerouted into the App 20A,
(4) after processing, the App 20A forwards the traffic to the SAVi functions module 210 and then back to the SCNC 100. As the service chain is predefined the SCNC 100 forwards the packet to the SAVi Function 210 which is responsible for the internal routing between different applications.
(5) the SAVi functions module 210 routes the packet to App 20B, and
(6) after processing, the App 20B forwards the traffic via the back to the SCNC 100 to encapsulate in GTP-U back to eNodeB 200, which then transmits it towards the UE 10.

Note: the uplink flows are very similar and will not be described here for the sake of brevity.

3.4. Control Traffic

SAVi system carries its user related control traffic over existing GTP-U sessions to establish end-to-end connectivity between SCNC 100 and SCND 110. This user related control traffic is encapsulated in GTP-U sessions such that each of SCNC 100 and SCND 110 recognize this traffic as non-user data traffic. The control messages are SAVi specific and have no meaning outside the SAVi realm. The user related control channel between SCNC 100 and SCND 110 is termed the "SAVi core network protocol".

The SCND 110 provides the SCNC 100 with the user identity associated with that GTP-U session via the control channel.

3.5. Copy Data Traffic

In the embodiment the SAVi Platform 1 has the listed services below which deliver user data/content directly to the end user 10 to, e.g., improve the Quality of Experiences (QoE) compared to providing those services from the network core:

Deliver content created or stored at an application 20A/20B located on the SAVi Platform 1.
Deliver content modified at an application 20A/20B located on the SAVi Platform 1.

As it is not permitted to introduce, for example, LI and charging capabilities, at thousands of base stations (or other elements at the network edge/RAN) the existing core network capabilities are reused. Therefore it is necessary to copy the user data/content in these cases, which is modified, stored or created at the SAVi platform 1, within the SCNC 100 and send uplink to the SCND 110 and SCNSF 120.

Figure 6:
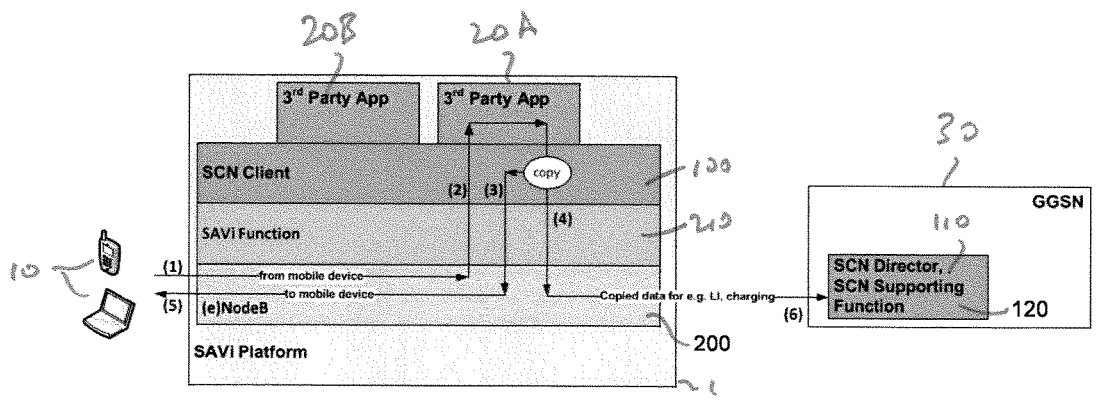
FIG. 6 shows Copy Data for SAVi Application downlink Traffic.

FIG. 6 shows how data is copied for SAVi Application downlink Traffic. The flow of user traffic is:
(1) The UE 10 transmits a user request to the eNodeB 200 as a GTP-U packet.
(2) eNodeB 200 routes the packet to SCNC 100, and the SCNC 100 determines that the user request can be satisfied by, for example, network or third party App 20A and routes the user request to the App 20A. The App 20A processes the user request and generates a response data packet, which might include content cached at the App 20A, content generated at the App 20A, or a modification of the data in the user request that is performed by the App 20A.
(3) After processing, the App 20A forwards the response data packet to the SCNC 100 for encapsulation in GTP-U and sending back to eNodeB 200. A copy of the response data packet is made
(4) The data packet, for forwarding to the gateway 30, is sent by the SCNC 100 to the eNodeB 200.
(5) eNodeB 200 transmits the response data packet towards the UE 10.
(6) eNodeB 200 transmits the response data packet copy to the gateway 30 for processing by the core network to perform core network functions such as LI and charging.

It should be considered that all uplink user requests to the applications 20A/20B on the SAVi Platform 1 may need to be copied to the core network for LI and charging and then the packets may get deleted (see section 4.3.4 and section 7.4, FIG. 24). Note: The uplink user request copy is not shown in FIG. 6.

3.6. Verification Traffic

Figures 7, 8, 9, 10:
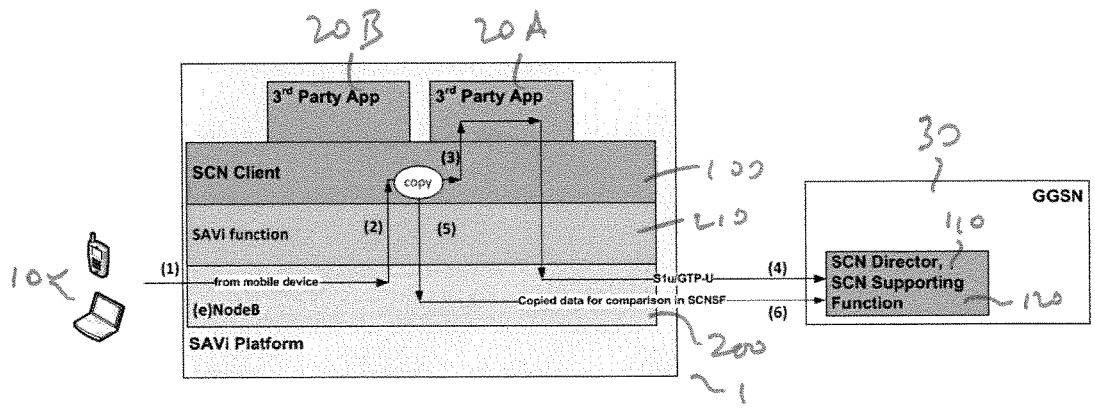
FIG. 7 shows Uplink traffic copy for diagnostic purposes.
FIG. 8 shows SCND (director) Discovery Request packet.
FIG. 9 shows SCNC (client) Discovery Response packet.
FIG. 10 shows SCNC (client) SAVi Discovery Request.

For diagnostic purposes it is advantageous to have the capability to verify/compare user requests to a network or third party application 20A/20B by sending a duplicate of the request in the uplink to the gateway/GGSN 30. FIG. 7 shows uplink traffic copy for diagnostic purposes.

The flow of user traffic is:
(1) The UE 10 transmits a user request to the eNodeB 200 as a GTP-U (user request) packet.
(2) eNodeB 200 routes the user request data packet to SCNC 100.
(3) The SCNC 100 determines that the user request data packet can be satisfied by, for example, network or third party App 20A and routes the user request to the App 20A. The App 20A processes the user request data packet and generates a response data packet, which might include content cached at the App 20A, content generated at the App 20A, or a modification of the data in the user request data packet that is performed by the App 20A.
(4) The response data packet is sent by the SCNC 100 to the eNodeB 200 and is then sent to the gateway 30 as a GTP-U (response) packet.
(5) A copy of the user request data packet, for forwarding to the gateway 30 is sent by the SCNC 100 to the eNodeB 200.
(6) The gateway 30 sends the response data packet and the copy of the user request data packet to the SCNSF 120. The SCNSF 120 then processes the packets to verify that the user request has been processed correctly by the platform 1. For example, the SCNSF 120 may host a reference version of App 20A. The SCNSF 120 processes the received copy of the user request data packed in the reference version of App 20A and obtains a reference response data packet as an output. If the content of the received response data packet is the same as the content of the reference response data packet, the SCNSF 120 can be satisfied that the App 20A hosted on the platform 1 is operated correctly (that is, the App 20A hosted on the platform 1 is producing the same responses as the reference version of App 20A).

The user content is copied only if required and compared with the user related content sent uplink by the network or third party applications 20A/20B. The comparison is performed in the SCNSF 120 in the core to identify if the App 20A is not operating as intended. FIG. 7 shows that the SCNC 100 uses a copy function. The SCNC 100 forwards the user content in a SCNC 100 Copy Data Packet to the SCNSF 120 via the SCND 110 which is able to compare the uplink content from the application with the copy content. See section 4.3.4.

So that the copy function of user related data for diagnostic purposes is only used when required, a policy message sent from the core network to the SCNC 100 is used to activate the copy function when needed.

As an alternative to having a copy function in the SCNC 100, a copy application may be introduced into the service chain. This would be the first application to receive uplink packets from the UE 10 and would copy them and send them to the core in a SCNC Copy Data Packet to produce the same effect as step (5) above. See section 4.3.4.

4 SAVi Core Network Protocol

A SAVi core network protocol (see section 3.4) is responsible for establishing an in-band control channel between SCNC 100 and SCND 110 that enables the SCNC 100 to apply, for example, per-user, per-traffic-type or service-type policies to user-traffic. The policies are applied in the platform 1 to route user traffic into appropriate applications/inline-services 20A/20B hosted on the SAVi enabled (e)NodeB platform 1, responsible for providing applications as proposed. This section provides details of procedures and messages exchanged between SCNC 100 and SCND 110, and high-level formats of individual messages. SAVi Core Network Protocol is responsible for providing following functionalities:

a) A Discovery Mechanism, so as to establish SCNC 100-SCND 110 per bearer relationship between SAVi capable (e)NodeB and SAVi capable core-network nodes.
b) A method for SCND 110 to discover SAVi Platform 1 capabilities (e.g. which services or applications are available at SAVi Platform) by requesting this information via the SCNC 100.
c) A method for SCNC 100 to update SAVi Platform 1 capabilities when changes and updates happen.
   Note for b) and c): The update of applications and services 20A/20B on the SAVi Platform 11 is not performed by the SAVi core network protocol. Nevertheless the SCNC 100 needs to be informed of any changes to inform the SCND 110 accordingly. This is a function between the SCNC 100 and the SAVi Platform 1.
d) A method for SCNC 100 to obtain per-user services/applications policies from SCND 110.
e) A method for SCND 110 to update policies to SCNC 100 for a given user or service/application at any time when required.
f) A method for SCND 110 to request the policies for a specific user at any time.
g) A method for SCNC 100 to send copied user traffic (content created or modified on SAVi Platform 1) back to SCND 110 and ultimately destined to SCNSF 120, so that it can be used for, for example, Charging or Lawful Intercept functions. Corresponding functionality on SCND 110 and SCNSF 120 is provided to extract original packets and feed them into function or services, for example, the LI system expects the same content as that sent to the customer. Therefore the SCNC 100 needs to copy all downlink user content originated or modified on the SAVi Platform 1 by specific applications/services 20A/20B. The SCND 110 needs to have the information that this content is copied to decide on the next actions.

The present embodiments are not directed to providing all of the above functionalities.

In the following subsections different methods of providing an in-band control channel are discussed which satisfy the criteria mentioned above.

SAVi In-band Control Channel may be implemented based on one of three options:
1. Use Echo Request and Response messages as means to implement SCNC 100-SCND 110 discovery and data transfer
2. Use Uplink Probing where specially formatted GTP-U messages are used to implement discovery mechanism and transfer policy and data. In this case the Discovery is initiated by SCNC 100.
3. Use Downlink Probing where specially formatted GTP-U messages are used to implement discovery mechanism and transfer policy and data. In this case the Discovery is initiated by SCND 110.

The subsequent sections describe Discovery mechanism and data transfer for the in-band control channel for each of the three methods.

4.1 SCNC/SCND Discovery Mechanism

To establish a relationship between SCNC 100 and SCND 110 for a user bearer before any SAVi policies are applied, SCNC 100 and SNCD 110 exchange a simple protocol to establish the control channel in-band over a GTP-U session.

The following high-level information is exchanged between the various functional components in SAVi during discovery:

SCNC 100 determines if the GGSN/P-GW 30 it is communicating with is SAVi compliant meaning that SCND 110 and SCNSF 120 are present and available for the given bearer.

SCNC 100 determines if all required functions or services are available via the connected GGSN, P-GW 30 and it needs to get updated on any changes in the availability of these functions.

Note: Users at a specific SAVi Platform 1 may get served by different core nodes.

SCND 110 needs to know and needs to get updated on any changes of the capabilities of the SAVi applications. functions and services 20A, 20B located in the RAN.

The following preferences are considered while determining the method and sequence of messages exchanged:
Discovery method is in-band carried over GTP-U.
The SCNC 100, SCND 110, relationship is dynamically established per bearer.
In case of service updates or the introduction of new service such information is dynamically distributed.

In cases where SAVi relationship needs to be extended to Outbound Roamers based on network operator agreements, it is proposed to enable the same by local configuration on the home GGSN/P-GW 30. The configuration may be defined per vPLMN. Similarly, for the case of Inbound Roamers, it is the responsibility of the Roamer's home GGSN/P-GW to establish SAVi relationship with visited PLMN's SAVi (e)NodeB if a commercial agreement is available.

The introduction of support for EU Local Breakout (LBO) should not have any impact on SCND 110 and SCNC 100 functions. Indeed a visited network could offer SAVi services to a visitor as part of an LBO agreement.

4.1.1. Preferences for SCNC and SCND Discovery
1. The procedure is clearly identifiable as a discovery mechanism
2. Bearers for APNs that do not require SAVi processing must be unaffected by any SAVi procedures, e.g. no G-PDUs (Transport Protocol Data Unit, T-PDU, plus a GTP header) solely used for SAVi may be sent over them at any time. (LI and charging issues)
3. In the roamed-out case a non-SAVi supporting V-PLMN must not receive any G-PDUs solely used for SAVi from a SAVi supporting H-PLMN (LI and charging issues)
4. In the roamed-in case a SAVi-supporting V-PLMN must not send any G-PDUs solely used for SAVi to a non-SAVi supporting H-PLMN (LI and charging issues)
5. The procedure is non-disruptive for combinations of eNodeB and P-GW where one has no SAVi capability.
6. UE 10 must itself discard downlink SAVi packets if an SCNC is not present in the eNB.

7. The SAVi association set up procedure must be resistant to the UE spoofing uplink SAVi packets
8. The SAVi association set up procedure must be resistant to the external network (e.g. internet 50, PDN) spoofing SAVi packets
9. The procedure allows SCNC 100 and SCND 110 to mutually authenticate if this is required.
10. To minimise resource utilisation in the P-GW 30, the SCND 110 should not need to maintain the state of each SAVi enabled bearer. The SCNC 100 should maintain such state.
11. The procedure works both with a combined S/P-GW 30 and with standalone S-GW and P-GW. For preference, a standalone S-GW should not require modification to work with SAVi.
12. The discovery procedure works for the following scenarios:
(In either case the previous cell may or may not have been SAVI-capable.)
    a. UE 10 enters a cell on a SAVi-capable eNodeB 1 and requests a new bearer
    b. UE 10 enters a cell on a SAVi-capable eNodeB 1 with an existing bearer 4.1.2. Discovery Initiation Whenever SCNC 100 receives uplink or downlink traffic, it checks whether it has a SCNC 100 to SCND 110 relationship established for the bearer. If the relationship does not exist, the SCNC 100 bridges the traffic back to (e)NodeB, from where it is sent to the GW 30 or the UE 10 in the conventional manner. It does not wait for the relationship to be established. In case of bridging, no SAVi related services are offered.

This approach might result in some SAVi Users not being subjected to SAVi processing at the first time of using the service; however, this is expected to happen only when the bearer has just been created and uplink or downlink traffic arrives at SCNC 100 before the SCNC 100-SCND 110 relationship is established, or if no SAVi processing is expected for the bearer as per policies received The possible methods for mutual SCNC 100-SCND 110 discovery are described below.

4.1.3. Downlink Discovery Using GTP-U Echo Messages

When a new bearer is established GGSN/P-GW 30 informs SCND 110 about the bearer creation. This triggers SCND 110 to immediately initiate a GTP-U Echo Request message with Private Extensions (see more details in section 4.1.3.1) destined to SCNC 100, requesting following information from the SCNC 100:

SAVI Compliancy Statement (Yes/No)
Version of SAVi protocol (e)NodeB 1, upon receipt of this GTP-U Echo Request Message with private extensions, routes it into the SCNC 100. The SCNC 100, upon inspection of this packet, learns that SAVi services are permitted for the given bearer. It records this information internally so that SAVi Services can be applied to subsequent packets arriving on this bearer. The SCNC 100 then replies to the SCND 110 with a GTP-U Echo Response message providing the information as listed above.

An alternative Uplink Discovery version of this mechanism is for the SCNC 100 to initiate the handshake by sending the Echo Request message containing a list of applications etc. and the SCND 110 replying with a GTP-U Echo Response containing the SAVi services that are permitted for the bearer.

The format of the SCND 110 Discovery Request packet is shown in FIG. 8.

The Discovery Request message contains the SAVi policy information for the bearer in its Data field.

Since SCNC 100 can detect that this is a SAVi Control GTP-U Echo message, it never releases the packet in downlink direction to (e)NodeB 1, and discards it after processing. The Echo response is generated by SCNC 100 itself providing the information as requested above, carried over Private Extensions.

SCNC 100 responds to the request with its SAVi compliance statement, SAVi protocol version, uplink TIED and a list of available applications 20A/20B.

The format of the SCNC Discovery Response packet is shown in FIG. 9.

Note that the SCNC 100 only responds to GTP-U Echo Messages carrying SAVi information. Any other GTP-U Echo messages will be released in downlink direction and (e)NodeB 1 will respond to these messages as part of usual path management procedure.

SCND 110 implements normal ECHO retransmission strategy before deciding that there are no SAVi services possible for the bearer. Once SCNC 100 to SCND 110 relationship is established, there is only the need to perform GTP-U ECHO (with Discovery messages) when the service catalogue on SAVi Platform 1 or SCND 110 changes or there is a change in set of SAVi applications 20A/20B allowed for the bearer. Normal ECHO mechanisms can continue irrespective of these transactions though.

When new services or applications are made available at the SAVi Platform 1 (or when changes are made to services or applications already available at the SAVi Platform 1), the same messages (Echo Request and Echo Response) are used to update SCND 110, so that SCND 110 can start providing policies related to the new (or changed) functionality for new users.

When the set of SAVi services allowed for the bearer changes on the GGSN/PGW 30 the same messages (Echo Request and Echo Response) are used to update SCNC 100, so that it can enforce the new policy set.

4.1.3.1. Private Extensions

| Octets | Contents |
| --- | --- |
| 1 | Type = 255 (Decimal) |
| 2-3 | Length |
| 4-5 | Extension Identifier |
| 6-m | Extension Value |

The format of the "Private Extension" IE is shown above. The Extension Identifier is a value defined in the IANA list of SMI Private Enterprise Codes. This list may, e.g., be found at http://www.iana.org/assignments/enterprise-numbers/enterprise-numbers (which supersedes the one in RFC 1700 referred to in 3GPP TS 29.281).

A new number can be assigned on request to IANA or a number already assigned to the MNO could be used.

The Extension Value contains the SAVi information described above. Note that Private Extensions can only be carried in GTP-U signalling messages such as Echo Request and Response.

4.1.4. Uplink Discovery Using G-PDUs

Uplink Discovery mechanism is initiated by SCNC 100 when a data packet (G-PDU) arrives (either downlink or uplink) and SCNC 100 does not have a SAVi relationship with a SCND 110 for this bearer. While the discovery procedure takes place between SCNC 100 and SCND 110 user packets are bridged—i.e. no SAVi services are applied until SAVi policy is sent from SCND 110. While the relationship does not exist, the SCNC 100 bridges the traffic back to (e)NodeB, from where it is sent to the GW 30 or the UE 10 in the conventional manner. In case of bridging, no SAVi related services are offered. In some cases this may cause SAVi services not be available for the initial packets until the Discovery procedure is completed but this method prevents SAVi services to be applied to bearers which are not authorized to receive them.

SCNC 100 sends a special GTP-U data message (G-PDU) to the SCND 110. The G-PDU is special because the T-PDU contained in it is addressed to the SCND 110 and is not intended for delivery to the External network (e.g. Internet 60, PDN).

The format of the packet is shown on in FIG. 10.

The Discovery Mechanism is achieved by use of T_PDUs with IP addresses that could never be found in a normal GPRS bearer.

For uplink the UE 10 address is used as a source IP address to prevent the packet being dropped by the anti-source spoofing feature of the GGSN 30. Destination IP address is 0.0.0.0 which is easily detected by a SAVi GGSN/P-GW 30 and will be dropped by a non-SAVi GGSN/P-GW. Any suitable UDP port number for source is used and for destination could be Port 3386 (actually assigned to the now obsolete GTP—Version 0).

Upon receiving the Discovery Request packet, the GGSN/P-GW 30 routes the packet into SCND 110 based on presence of this unique (0.0.0.0) IP Address. SCND 110 in turn identifies the bearer and looks up its SAVi information. If the bearer is allowed to use SAVi services then SNCD 110 formulates a Response packet and includes appropriate policy in the Data field. If SAVI services are not allowed for the bearer, SCND 110 returns Response with Data field Null.

FIG. 11 shows the SCNC 100 SAVi Discovery Response format.

The Discovery Response packet is sent as regular GTP-U packet with destination IP address=UE IP address and source IP address=0.0.0.0. This will be intercepted by the SCNC 100 and not forwarded to the UE.

4.1.5. Downlink Discovery Using G-PDUs

This downlink discovery procedure is initiated by the SCND 110, in order to avoid the problems that arise from an uplink discovery procedure initiated from the SCNC 100. In particular it should be noted that an uplink procedure initiated by the SCNC 100 might not satisfy certain of the compatibility requirements (see list in section 4.1.1) since the SCNC 100 is not APN-aware and does not know the identity of the PLMN in which the P-GW 30 is located and therefore its SAVi capabilities.

The SCND 110 does not maintain SAVi state for each bearer. However, it does perform a stateful 3-way handshake procedure in order to establish a relationship between the SCND 110 and SCNC 100 for each bearer. The SCNC 100 does maintain the SAVI state for each bearer.

The SCNC-SCND relationship is achieved by a 3-way handshake initiated by the SCND 110, hence the term: "downlink discovery". It is triggered by any of the following events:

For a newly-created bearer it takes place immediately after the P-GW 30 has completed the normal bearer creation procedure.

For a RAT type change from a non-SAVI capable to a SAVI capable RAT type it takes place following the bearer modification procedure.

For a UE entering a cell on a SAVi-capable eNodeB with an existing bearer, the trigger mechanism described in the following section is used.

The SCND 110 starts the procedure by performing checks that:

a) SAVI is enabled for this APN b) Subscriber 10 has SAVi service c) Subscriber 10 is not roaming or a SAVi Roaming agreement exists (Roaming is indicated by the S-GW/SGSN IP address not being in the local EPC/network core.)

d) RAT type is SAVi capable in the serving PLMN. The P-GW 30 knows the RAT type through normal GTP-C messages. The support for SAVi on this RAT type would be part of the SAVi Roaming Agreement—see c. above.

With this mode of probing, the initiation of the 3-way handshake could be selectively performed only towards a SAVi capable eNodeB 1. This would require the SCND 110 to a) identify the eNodeB that the UE is currently using, and b) consult a database (e.g. PCRF 80) to determine if this eNodeB 1 is SAVi-supporting. Based on this information, the SCND 110 could decide whether to initiate these messages towards that eNodeB 10 or not. This procedure would require usage of the ULI (User Location Information) reporting feature on core nodes. The ULI Information Element is carried in bearer creation and bearer update messages and is defined in 3GPP TS 29.060, Section 7.7.51.

Figure 21:
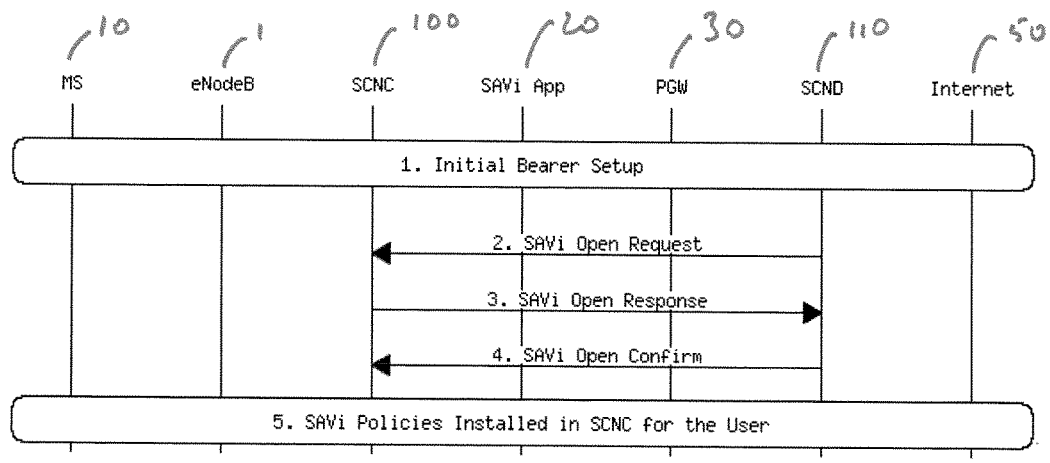
FIG. 21 shows the message flows in a SAVi Relationship Establishment Procedure.

The relationship discovery procedure is shown in FIG. 21.

After the initial bearer setup (step 1, FIG. 21) In the event that the eNodeB 1 is determined to be SAVi-supporting or its state of SAVi support is unknown, the SCND 110 then sends a SAVi Open Request in the downlink tunnel (step 2, FIG. 21).

FIG. 12 shows a SCND 110 SAVi Open Request

The Data field contains:

PLMN ID (core)

SCND ID

SAVi relationship ID (generated by and unique to this SCND) Authentication challenge 1 if required The TPDU has Source=0.0.0.0, Destination=UE IPaddr, UDP S=tbd, D=3386

If no response is received this message is repeated up to a predetermined number of times at predetermined time intervals before the eNB 1 is considered to be non-SAVi enabled)

The SCNC 100 receives the SAVi Open Request in the downlink tunnel and it sends a SAVi Open Response on the corresponding uplink tunnel (step 3, FIG. 21). (These are linked in the eNB 1 by the Bearer ID.) The SCNC 100 may reject the request if it is unable to provide SAVi service.

FIG. 13 shows a SCNC 100 Open Response.

The Data field contains:

PLMN-ID (RAN)

SCND ID

Result code (accept, reject, . . . )

SAVi relationship ID (This is as received from SCND unless the SAVi relationship already exists in which case the existing SAVi relationship ID is used.)

SCNC ID

Authentication response 1 if required

Authentication challenge 2 if required

The T-PDU has Source=UE IPaddr, Destination=0.0.0.0, UDP S=3386, D=as sent by SCND (Source=UE IPaddr ensures that the packet is not blocked by the P-GW's UE source address anti-spoofing filter.)

To complete the handshake the SCND 110 sends an Open confirm message to the SCNC 100 (step 4, FIG. 21).

FIG. 14 shows a SCNC 100 Open Confirm Message.
The Data field contains:
SCND ID
SAVi relationship ID (received from SCNC)
SCNC ID
Result code (accept, reject, . . . )
Authentication response 2 if required
Subscriber's SAVi profile (rules)
Subscriber identity information as required
The TPDU has Source=0.0.0.0, Destination=UE IPaddr, UDP S=tbd, D=3386

The SCNC 100 now has a SAVi profile for this bearer and SAVi applications 20A,20B can be run in the eNB 1 (step 5, FIG. 21).

The steps of FIG. 21 can be summarised as follows:
(1) Initial Bearer Setup happens between UE 10 and P-GW 30 which acts as a trigger for the P-GW 30 to start the SAVi Relationship Establishment Procedure "Modify Bearer" and "Uplink Extension Header Probe" are other possible triggers to start this procedure.
(2) SCND 110 in P-GW 30 issues SAVi Open Request (as a G-PDU).
(3) The eNodeB 10, upon receiving this packet, routes it into SCNC 100. SCNC 100 responds back with SAVi Open Response (as a G-PDU).
(4) SCND 110 responds back with SAVi Open Confirm message (as a G-PDU). This message carries policies & rules to be applied to user traffic received at SCNC 100.
(5) At this point, SCNC 100 knows about the policies to be associated with a given bearer. Any subsequent traffic arriving at SCNC 100 on this bearer will be subjected to these policies.

4.1.6. Trigger Mechanism Using G-PDU Extension Header

A weakness of the Uplink Discovery procedure using G-PDUs is that the SCNC 100 sends G-PDUs that are solely used for SAVi. This can potentially cause LI and charging problems for non-SAVi APNs and in the roamed-in case. Whilst the "Downlink Discovery procedure using G-PDUs" overcomes this problem it creates a new problem in that a SAVi relationship can only be established when a bearer is created or modified. When a UE enters a cell on a SAVi-capable eNodeB with an existing bearer no SAVi relationship is established.

The procedure described in this section triggers the SCND-initiated, 3-way handshake described in the Downlink Discovery procedure using G-PDUs (section 4.1.5) but rather than being triggered solely by a bearer creation or modification, it is triggered in addition by an Uplink Discovery "probe" from the SCNC 100. This eliminates the single non-compliant aspect of the Downlink Discovery procedure using G-PDUs, i.e. how to alert the SCND 110 in the case of the arrival of a UE 10 with an existing PDN context in a SAVi-supporting eNodeB 1. The "probe" is initiated by the SCNC 100 when the first uplink G-PDU is received from the UE 10 after the bearer has been created in the eNodeB 1. It is carried in a header extension field of this first one (and possibility a small number of subsequent) uplink G-PDU(s). Unlike the "Uplink Discovery procedure using G-PDUs" this procedure satisfies the requirement of not sending G-PDUs that are solely used for SAVi before it is known that both SCNC 100 and SCND 110 are present in the path. However it does rely on an uplink G-PDU arriving at the SCNC 100 from the UE 10 within a reasonable time after the bearer has been created in the eNodeB 1. It should not require any modification to the S-GW in a standalone configuration.

This probing procedure uses the header of the first one or more uplink G-PDUs (GTP-U messages carrying user data) to indicate that the eNodeB 10 is SAVi capable. It makes use of the GTP-U Extension Header feature.

4.2. SCNC-SCND Relationship Deletion Procedure

The SCNC 100-SCND 110 relationship for a bearer can be forcibly deleted whilst a UE 10 is connected to a SAVi-capable eNodeB 1 by either party initiating the Relationship Deletion Procedure. In both cases this results in SAVi processing ceasing for that bearer. This may be immediate or the application(s) 20A/20B may be allowed to terminate gracefully. The Close Request and Response messages use the same format as the Update Request and Update Response.

In the SCND 110-initiated deletion, the Data field in the Close Request indicates how the applications 20A/20B are to be terminated either immediately or allowed to proceed to completion. The Close Response confirms that the Close Request has been received and complied with, not that the application terminations are necessarily complete. An unexpected Close Response is ignored.

In the SCNC 100-initiated relationship deletion, the Close Request indicates that an event has occurred in the SAVi eNodeB 1 that requires the relationship to be deleted. The applications 20A/20B will no longer be processing traffic for this bearer. The Close Response confirms receipt by the SCND 110. An unexpected Close Response is ignored.

When a bearer is deleted by the user or network, or the UE 10 leaves a SAVi-capable eNodeB 1 the SCNC 100 deletes the SAVi Relationship. An activity timer may also be used to delete the SAVi relationship in the SCNC 100. It is not necessary for the SCNC 100 to notify the SCND 110 since the SCND 110 is stateless. However such information might be useful for diagnostic purposes so optionally the SCNC 100 may send a Close Request to the SCND 110 if the uplink tunnel is still available.

4.3. SCNC—SCND Information Transfer Procedure

This section describes the procedure for SAVi information transfer for a specific bearer between the SCNC 100 and SCND 110 once a relationship has been established for this bearer.

The information is sent between SCND 110 and SCNC 100 using the same message format as is used for the Discovery messages described in section 4.1.

4.3.1. SAVi Information Transfer Using Echo Messages

This section describes SAVI policy and copied data transfer for the case where Echo messages are used to implement an in-band control channel between SCNC 100 and SCND 110. A pair of request and response messages is used and the transaction can by initiated by either the SCNC 100 (as shown below) or the SCND 110 depending on which end has new information to report to the other.

If SAVi applications, functions or services 20, 20A, 20B are changed on the SAVi Platform 1 then the SCNC 100 sends Update-Request message as in FIG. 15 (see also section 5). The message contains details of the changed applications, functions or services. In response to the Update-Request message, SCND 110 saves the SAVi policies and sends Update Response message as in FIG. 16.

A change in SAVi applications, functions or services 20, 20A, 20B would be triggered by the addition or removal of the SAVi services.

If the SAVi services authorised for the bearer change then the SCND 110 initiates the procedure described above. The formats of the messages are the same as shown above except the Request carries the Policy Data. The Data field in the Response may be empty.

If a SAVi application 20A/20B is generating downlink data locally or there is a requirement for verification purposes to compare the uplink data from the UE 10 with that sent uplink by the application 20A/20B to the GGSN 30 then a copy of this data is transferred from the SCNC 100 to the SCNSF 120 (SAVi Core Network Supporting Function) via the SCND 110. The format of the message in this case is shown in FIG. 17. The U/D/V flag indicates if the data is a copy of an uplink, downlink or verification packet. In this case the SCND 110 receives the data and passes it to the appropriate supporting function. This message may be acknowledged by the SCND 110 using a corresponding Echo Response message although the SCNC 100 need take no action on receipt. Instead, a TCP type of ACK mechanism, whereby not every packet is ack-ed individually could be used to reduce the signalling load if an acknowledgement is required. Alternatively, the message could be left unacknowledged and the light-weight SAVi Relay Function in the S-GW (see section 4.1.3) would need to ensure that the missing Echo Response message did not trigger the standard error handling procedure.

4.3.2. SAVi Information Transfer Using G-PDUs

This section describes SAVI policy and copied data transfer for the case where GTP Data (G-PDU) messages are used to implement an in-band control channel between SCNC 100 and SCND 110. It can be used following either the Uplink or Downlink Discovery using G-PDUs.

A pair of request and response messages is used and the transaction can be initiated by either the SCNC 100 (as shown in FIGS. 18 and 19) or the SCND 110 depending on which end has new information to report to the other. These messages are distinguished from messages carrying user data by the use of the same "special" IP addresses as used by the G-PDU based discovery procedure.

If SAVi services are changed on the SAVi Platform 1 then the SCNC 100 sends Update-Request message as in FIG. 18. In response to the Update-Request message, SCND 110 saves the SAVi policies and sends Update Response message, as shown in FIG. 19.

A change in SAVi services would be triggered by the addition or removal of the SAVi services.

If the SAVi services authorised for the bearer change then the SCND 110 initiates the procedure described above. The formats of the messages are the same as shown in FIGS. 18 and 19 except the Request carries the Policy Data. The Data field in the Response may be empty.

If a SAVi application 20A/20B is generating downlink data locally or there is a requirement for verification purposes to compare the uplink data from the UE 10 with that sent uplink by the application 20A/20B to the GGSN 30 then a copy of this user data is transferred from the SCNC 100 to the SCNSF 120 (SAVi Core Network Supporting Function) via the SCND 110. The format of the message is shown in FIG. 20. The U/D/V flag indicates if the data is a copy of an uplink, downlink or verification packet. In this case the SCND 110 receives the data and passes it to the appropriate supporting function. This message could be acknowledged by the SCND 110 using the corresponding Response message although the SCNC 100 need take no action on receipt. Alternatively, the message could be left unacknowledged.

4.3.3. Policy Data

This is the data sent from SCND 110 to SCNC 100 in the downlink direction. The policy data specifies a set of policies that tell the SAVi client 100 how to handle flows for the particular bearer. Each policy can be specified for the whole flow or using a 5-tuple that uniquely identifies the flow (Source IP Address, Destination IP Address, Transport Protocol, Source Port, Destination Port).

The Policy Data is sent using the appropriate (Echo or G-PDU) in-band control channel described in sections 4.3.1.

TABLE 1

| Policy Data | |
|---|---|
| Policy Data | This field contains:<br>    Whole flow indicator or 5 tuple<br>    policy info<br>    Policy info includes<br>        Applications to be inserted in the data path.<br>        Sequence of the applications to be used<br>        Additional parameters used by the apps if required<br>            E.g. Copy of downlink data required<br>            E.g. Service chain (order how packets pass through<br>            applications used) |

Figure 25:
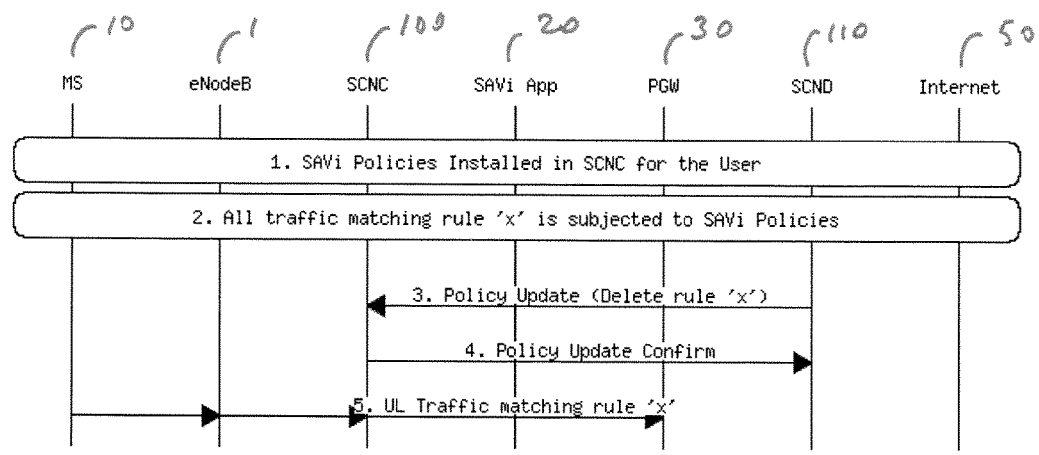
FIG. 25 shows Policy Update Midway through the session.

The policy may be updated midway through a session. FIG. 25 shows the steps performed when such an update occurs. The following steps are shown in FIG. 25.

(1) The SAVi Relationship has been established and therefore the SCNC 100 knows about the policies to be associated with this bearer. Any subsequent traffic arriving at SCNC 100 on this bearer will be subjected to these policies.

(2) Let's assume one of the flows in user-traffic is matching rule 'x' and is subjected to SAVi processing.

(3) SCND 110 initiates a SAVi Policy Update Request to SCNC 100. The message arrives at the SCNC 100 indicating user is no longer allowed to use SAVi Application associated with rule 'x'.

(4) SCNC 100 updates user policies, deletes rule 'x' association with this user and sends SAVi Policy Update Confirm message to the SCND 110.

(5) From now onwards, all traffic matching rule 'x' is not routed into SAVi
App, and is instead sent directly to P-GW.

4.3.4. Copy Data

This is the data sent from the SCNC 100 100 to the SCND 110 110 in the uplink direction. This data is destined for the SAVi Core Network Supporting Function (SCNSF) 120 to enable proper functioning of LI and charging or for verification purposes. Upon receiving copy data for LI and charging, the SCNSF 120 injects the data in the uplink or downlink direction so that LI and charging can be performed. Injecting the received data into the normal data stream and subjecting them to the same treatment as the regular data is subject to, e.g. as traffic management, is instrumental in making the byte counts accurate in the billing records as well as towards OCS 40 and PCRF 80 as required. Later on this data is discarded by the SCND 110. The mechanism is used to label these packets so the SCND 110 recognises that they must be discarded. Copy data received for verification purposes is sent, together a copy of the normal uplink data, to a verification function.

The Copy Data is sent using the in-band control channel described in sections 4.3.1.

4.3.5. SAVI User Information in SCNC 100 and SCND 110

As a result of SAVi relationship establishment, SCNC 100 and SCND 110 may maintain some or all of the following information about the subscribers in their databases for each bearer. The actual information will depend on the application and privacy requirements.

TABLE 2

Subscriber Data

| | |
|---|---|
| IMSI | International Mobile Subscriber Identity - The unique subscriber identifier (use is not recommended for security reasons) |
| MSISDN | Mobile Subscriber ISDN number - This is the directory number for the subscriber (the use of an Anonymous Customer Reference (ACR) is preferred - see below) |
| IMI(-SV) | International Mobile Equipment Identity - The unique identifier for the mobile phone itself (a shortened form identifying only the device type and software version is preferred for security reasons) |
| UE IP Address | This is the IP address assigned by the P-GW to the UE when the bearer is created |
| APN | Access Point Name - This uniquely identifies the Access Point in the P-GW to the external PDN for the bearer. If it is required to be globally unique it must consist of both the APN Network ID and the APN Operator ID |
| ACR | Anonymous Customer Reference - an obscured form of the MS-ISDN or IMSI that a third party may use to uniquely identify a customer using an application but that can only be converted back to the clear form by the network operator. |
| Bearer ID | This is used to identify the bearer.<br>In the SCNC 100 a bearer ID comprises:<br>Uplink TEID + TLA; downlink TEID + TLA (see note)<br>In the SCND 110 a local identifier related to the PDN Context may be used |
| SCNC 100 ID | Unique identifier of the SCNC 100 |
| SCND 110 ID | Unique identifier of the SCND 110 |
| Policy Information | One or more 5-tuple rules to allow traffic steering into applications |

Note that a Tunnel Endpoint Identifier (TEID) in itself does not uniquely identify a tunnel in an eNodeB. The Transport Layer Address (TLA) which is the IP address of the receiving tunnel endpoint is also required. The pair, TEID+TLA, is unambiguous.

6. SAVi Platform 1 Relation to SCNC 100 Requirements

6.1. SAVi Platform

SAVI Platform 1 needs to support proper functioning of SAVI architecture based on Client (SCNC 100) and Director (SCND 110) components as outlined herein. As outlined in Section 3, SCNC 100 implements the in-band control channel towards SCND 110 and then based on the per subscriber policies it controls routing the packet through the sequence of applications 20A/20B permitted for the user. In order to fulfil these functions SCNC 100 has to have visibility of all the uplink and downlink user traffic. Additionally, based on policies received from SCND 110, SCNC 100 needs to be able to control how packets are routed through the SAVi applications 20A/20B via the SAVi specific functions 200 on the SAVi Platform 1. Therefore the SAVi functions on the SAVi Platform 1 are responsible for routing. Furthermore for system resiliency, flexibility and extensibility when new applications 20A/20B are added, a separation between SCNC 100 and SAVI Applications 20A/20B has to be provided. Also a separation between SAVi applications 20A/20B themselves is needed. SAVi functions 200 on the SAVi Platform 1 need to be able to route the packet between various applications 20A/20B as directed by SCNC 100. Virtualized environment is one of the examples of practical implementation of a system with these properties.

6.2. User Data Path

The SAVi compliant platform 1 always sends the user related packets to the SCNC 100. This applies to the user data packets in both uplink and downlink directions. Since both uplink and downlink user packets are exchanged between the SCNC 100 and the SAVi Platform 1, either two interfaces are needed (to/from UE 10 and from/to S-GW) or the direction (uplink or downlink) of each user packet needs to be indicated explicitly by a tag.

The SCNC 100 and the applications 20A/20B need to know the association between the uplink and downlink tunnels that constitute each bearer. In an eNodeB 10 the 4-tuple, (Uplink TEID+TLA; downlink TEID+TLA) uniquely identifies a bearer. Either the uplink or downlink pair is already present in the IP and GTP headers. The other pair could be provided in a tag. Alternatively the SAVi Platform 1 could send the 4-tuple over a separate control interface when the bearer is created.

Note that a Tunnel Endpoint Identifier (TEID) in itself does not uniquely identify a tunnel in an eNodeB. The Transport Layer Address (TLA) which is the IP address of the receiving tunnel endpoint is also required. (The pair, TEID+TLA, is unambiguous.)

6.3. SAVi in-Band Control

The packets destined to the SCNC 100 are recognized by the special signature that depends on the in-band control mechanism described in this specification. These packets are sent to the SCNC 100. If there is no SCNC 100 present they will be discarded by the UE 10.

Note that there may be overlapping UE IP-Addresses on the SAVi Platform 1 in that it is possible for two bearers to have the same UE IP address. Therefore applications need to handle ID tagging of IP packets with the above-mentioned tunnel identification as a mandatory requirement.

The section headings and numbering used in this description are for ease of reference, and should not be interpreted as limiting the scope of the invention.

The invention claimed is:

1. A mobile telecommunications network, the mobile communications network including a network core capable of providing core network functions and a radio access network capable of communicating with mobile terminals, the mobile telecommunications network further comprising:
a director function, the director function being located in the network core; and
a client function, the client function being located in the radio access network, the client function being capable of copying data from at least one of a plurality of applications hosted in the radio access network and transmitting the data to the director function on the network core,
whereby core network functions may be provided to a user of the mobile telecommunications network while radio access network functions may simultaneously be provided to the user of the mobile telecommunications network,
wherein the client function is operable to control routing of traffic within the radio access network to the plurality of applications hosted on the radio access network according to policy information provided by the director function of the core network,
wherein one or more of the applications is operable to service a request from a mobile terminal and accordingly sends a response data packet to the mobile terminal, and
wherein the client function is operable to send a copy of the response data packet in an encapsulated form to the network core based on the policy information, the encapsulation including applying a custom copy packet format to the response data packet, and further allowing content generated on the radio access network and subsequently sent to the core network to appear, upon decapsulation, as if the content originated from the core network.

2. The network of claim 1, wherein the policy information is specific to a terminal, user or to a particular bearer.

3. The network of claim 1, wherein the director function is capable of providing the client function with an indication of a change in the policy information, the client function being operable to control routing of traffic within a controller according to the change in the policy information.

4. The network of claim 1, wherein the client function is operable to send a message to the director function to indicate a change in the services available on a controller, the director function updating the policy information in response thereto.

5. The network of claim 1, wherein the client function is operable to verify the functioning of an application hosted by a controller.

6. The network of claim 5, wherein the controller is operable to receive a request for service from one of the terminals for the application (20, 20A, 20B), to send the request to the application and to send a response from the application to the terminal, wherein the controller is further operable to send a copy of the request for service and a copy of the response to the core network to enable the core network to verify the operation of the application.

7. The network of claim 1, wherein uplink and downlink user traffic for the terminals is routed through the client function such that the user traffic can be processed in accordance with the policy information.

8. The network of claim 7, wherein the client function is operable to distinguish between the uplink and downlink user traffic.

9. A method of operating a mobile telecommunications network, the method including:
   an act of providing a network core capable of providing core network functions;
   an act of providing a radio access network capable of communicating with mobile terminals;
   an act of providing a director function, the director function being located in the network core; and
   an act of providing a client function, the client function being located in the radio access network, the client function being capable of copying data within the radio access network and transmitting the data to the director function on the network core,
   whereby core network functions may be provided to a user of the mobile telecommunications network while radio access network functions may simultaneously be provided to the user of the mobile telecommunications network,
   wherein the client function is operable to control routing of traffic within the radio access network to the plurality of applications hosted on the radio access network according to policy information provided by the director function of the core network,
   wherein one or more of the applications is operable to service a request from a mobile terminal and accordingly sends a response data packet to the mobile terminal, and
   wherein the client function is operable to send a copy of the response data packet in an encapsulated form to the network core based on the policy information, the encapsulation including applying a custom copy packet format to the response data packet, and further allowing content generated on the radio access network and subsequently sent to the core network to appear, upon decapsulation, as if the content originated from the core network.

10. The method in accordance with claim 9, wherein at least one of a plurality of applications are hosted in the radio access network, the at least one of the plurality of applications performing operations on the data.

11. The method in accordance with claim 10, wherein the at least one of the plurality of applications performs operations on the data before the client function copies the data.

12. The method in accordance with claim 10, wherein the at least one of the plurality of applications performs operations on the data after the client function copies the data.

13. The method in accordance with claim 10, wherein the data is a request for service for the at least one of the plurality of applications.

14. The method in accordance with claim 13, wherein the request for service is sent to the at least one of the plurality of applications via the client function, the client function being capable of routing the request for service within the radio access network.

15. The method in accordance with claim 9, wherein the client function copies the data based on policy information obtained from the director function.

16. The method in accordance with claim 9, wherein the core network functions comprises at least one of the following: lawful intercept, charging, and mobility management.

17. A system, the system comprising:
   a network core capable of providing core network functions, the network core comprising a director function, the director function being configured to perform one or more of the following acts:
      an act of managing functions and services in the client function;
      an act of securely authenticating with the client function;
      an act of sending policies to the client function; and
      an act of collecting data from the client function;
   a radio access network capable of communicating with mobile terminals, the radio access network comprising a client function, the client function being configured to perform one or more of the following acts:
      an act of copying data from at least one of a plurality of applications hosted in the radio access network and transmitting the data to the director function on the network core;
      an act of authenticating with the director function;
      an act of informing the director function about new user sessions;
      an act of informing the director function about content and applications that are in use; and
      an act of applying policies sent by the director function, the application of the policies occurring in the radio access network;
   whereby core network functions may be provided to a user of the mobile telecommunications network while radio access network functions may simultaneously be provided to the user of the mobile telecommunications network,
   wherein the client function is operable to control routing of traffic within the radio access network to the plurality of applications hosted on the radio access network according to policy information provided by the director function of the core network, wherein one or more of the applications is operable to service a request from a mobile terminal and accordingly sends a response data packet to the mobile terminal, and wherein the client function is operable to send a copy of the response data packet in an encapsulated form to the network core based on the policy information, the encapsulation including applying a custom copy packet format to the response data packet, and further allowing content generated on the radio access network and subsequently sent to the core network to appear, upon decapsulation, as if the content originated from the core network.

* * * * *